United States Patent
McKenney et al.

(10) Patent No.: US 7,971,243 B2
(45) Date of Patent: *Jun. 28, 2011

(54) SECURITY MODULE

(75) Inventors: Paul E. McKenney, Beaverton, OR (US); Orran Y. Krieger, Newton, MA (US); Boas Betzler, Magstadt (DE)

(73) Assignee: International Business Machines Corporation, Armonk, NY (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/756,615

(22) Filed: May 31, 2007

(65) Prior Publication Data
US 2008/0022127 A1    Jan. 24, 2008

Related U.S. Application Data

(63) Continuation of application No. 11/334,483, filed on Dec. 30, 2002, now Pat. No. 7,392,376.

(51) Int. Cl.
*G06F 9/06* (2006.01)
(52) U.S. Cl. ............ 726/20; 726/22; 380/202; 380/251; 380/264; 713/152; 713/169
(58) Field of Classification Search .................. 380/202, 380/251, 264; 713/152, 169; 726/20, 22
See application file for complete search history.

(56) References Cited

U.S. PATENT DOCUMENTS

| | | | | |
|---|---|---|---|---|
| 5,136,643 | A | * | 8/1992 | Fischer .................... 713/178 |
| 5,199,066 | A | | 3/1993 | Logan |
| 5,469,507 | A | * | 11/1995 | Canetti et al. .................. 380/30 |
| 5,737,415 | A | | 4/1998 | Akiyama et al. |
| 5,933,087 | A | | 8/1999 | Wright et al. |
| 6,394,905 | B1 | | 5/2002 | Takeda et al. |
| 7,392,376 | B2 | * | 6/2008 | McKenney et al. ........... 713/152 |

FOREIGN PATENT DOCUMENTS
DE       4321765       1/1994

* cited by examiner

*Primary Examiner* — Michael Pyzocha
*Assistant Examiner* — Paul Callahan
(74) *Attorney, Agent, or Firm* — Lieberman & Brandsdorfer, LLC

(57) ABSTRACT

A method and apparatus for restricting access of an application to computer hardware. The apparatus includes both an authentication module and a validation module. The authentication module is within the trusted firmware layer. The purpose of the authentication module is to verify a cryptographic key presented by an application. The validation module is responsive to the authentication module and limits access of the application to the computer hardware. The authentication modules may be implemented in software through a firmware call, or through a hardware register of the computer.

15 Claims, 3 Drawing Sheets

SECURITY MODULE

CROSS REFERENCE TO RELATED APPLICATION(S)

The present application is a continuation of U.S. patent application Ser. No. 10/334,483, filed Jan. 19, 2006, now U.S. Pat. No. 7,392,376, and is hereby incorporated by reference.

BACKGROUND OF THE INVENTION

1. Technical Field

This invention relates to an apparatus and method for enabling access to restricted hardware of a computer system. More specifically, a key is processed to control the restricted access.

2. Description of the Prior Art

Game sets for use in conjunction with a television set are an ever increasing form of home entertainment. The game sets are computers that commonly include an accessory to enable a player to communicate with the game set. The game sets have evolved over recent years to provide a more realistic playing experience which requires much real time computation in order to accomplish the desired real time playing experience. Accordingly, the CPU of the game set includes a computer with enhanced computing abilities.

Computers comparable to the game set CPU available to the consumer are considerably more expensive to purchase than the game set. The expense associated with the game set is offset by game accessories. The consumer who purchases the game set actually purchases the set at a discount. The game vendor of the game set loses money on each sale. However, the consumer price of a game accessory, such as a game cartridge or disc, is considerably more expensive than the cost associated with producing the game. The loss associated with the sale of the game set is overcome in the sale of the game cartridges. Accordingly, the game vendors have come to rely on revenues associated with the sale of games for profit and have accepted the losses associated with the sale of game units.

In view of the sale strategy established by the game vendors, access by independent software developers to the CPU of the game set is restricted. This prevents the independent software developer from taking advantage of the enhanced capabilities of the CPU and creating games compatible with the game set and selling them at a reduced cost to the consumer. However, the access restriction placed on the game set does not take into consideration other uses of the CPU by non-competitors. For example, the CPUs of the game sets have enhanced graphics and video capabilities which could be beneficial to educational institutions and/or for computer aided design. Similarly, a person who programs as a hobby may have an interest in taking advantage of the enhanced abilities of the CPU. Accordingly, there is a need for enabling access to the CPU and enhanced peripherals of the CPU by non-game competing entities, while maintaining restrictions on access by game competing entities.

SUMMARY OF THE INVENTION

This invention comprises a method and apparatus to enable restricted access to computer hardware.

In one aspect of the invention, a verification apparatus is provided. The apparatus includes an authentication module accessed by a trusted firmware layer. The authentication module is adapted to verify a cryptographic key. The apparatus also includes a validation module responsive to the verification key to restrict access of an application to a hardware resource. The authentication module may be implemented in software as part of the trusted firmware layer. The key may be computed from a value previously obtained from the authentication module. Alternatively, the authentication module may be adapted to utilize a hardware register. In the case of the hardware register, a first hardware register holds the key and a second hardware register communicates with the hardware resource. A third hardware register may be implemented to present a value from which the key must be computed.

In another aspect of the invention, an article comprising a computer-readable medium is provided. The article includes a cryptographic key adapted to be verified through a trusted firmware layer, a verification module adapted to respond to the key, and computer hardware adapted to receive limited access in response to verification of the key. The medium may be a recordable data storage medium. Key verification may be implemented in software as part of the trusted firmware layer or through a hardware register. Limited access to the hardware is responsive to presentation of the key to the verification module. The hardware may be a central processing unit of a game set, and it may also include a graphics accelerator, a floating point accelerator, and a high resolutions frame buffer.

In yet another aspect of the invention, a game set with a central processing unit having an acceleration hardware resource, an authentication module, and a validation module is provided. The authentication module is accessed through a trusted firmware layer and is adapted to verify a cryptographic key. The validation module is responsive to verification of the key to restrict access of an application to the hardware resource. The key may be computed from a value previously obtained from the authentication module. The authentication module may be implemented in software as part of the trusted firmware layer, or the authentication module may be adapted to utilize a hardware register. In the case of the hardware register, a first hardware register holds the key and a second hardware register communicates with the hardware resource.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The manufacturers of home entertainment sets leverage the cost of the set for the cost of accessories. The game sets are comprised of CPUs with enhanced graphics and timing, and only authorized software has access to the enhanced hardware of the game set CPU. There is a need to enable non-competitors of the game set manufacturers to be able to access the enhanced hardware of the game set through an authorization system.

TECHNICAL BACKGROUND

Each game set has a CPU and associated hardware to enable an authorized game to properly function and to provide virtual effects that appear in real time. Some of the hardware that enables the real time effects include a graphics accelerator, a floating point accelerator and a high resolution frame buffer. In addition, each game set includes a trusted firmware layer that cannot be replaced with an unauthorized piece of firmware. Firmware is software that is stored in hardware, such that the software is retained even after power to the hardware ceases. At boot time, the firmware of a computer stores and uses information describing a computer's processor, memory and other devices. The firmware operates on a parallel platform to the operating system.

Figure 1:
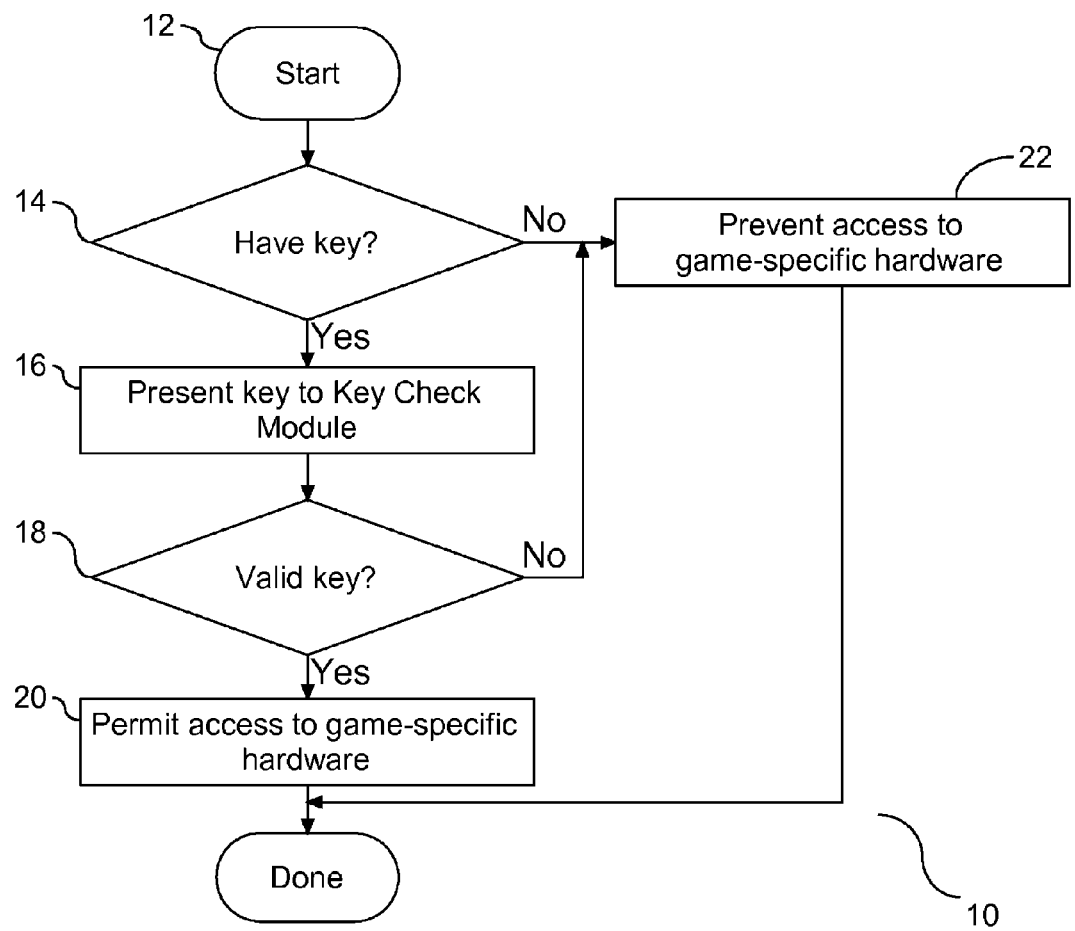
FIG. 1 is a flow chart illustrating the process of presenting a key to the authentication module.

A verification apparatus is provided to enable software and/or hardware to authenticate access to the CPU and related hardware accessories of the game set. The application requesting authorization must present a key, preferably a cryptographic key, to an authentication module. FIG. 1 is a flow chart (10) illustrating the process of the application requesting access to the game set CPU and hardware. Following access to the verification apparatus, (12), the application is queried for presentation of a key (14). If the application has a key, the key is presented to an authentication module (16). The key is then tested by the authentication module to determine if the key presented by the application is valid (18). The authentication module is accessed through the trusted firmware layer of the CPU. If the key is determined to be a valid key, then a validation module permits the application access to some or all of the memory and hardware accessories of the game set (20). However, if the key is determined to be an invalid key at step (18), then the validation module prevents the application from access to some or all of the memory and hardware accessories of the game set (22). Similarly if the application does not have a key at step (14), then the authentication module prevents the application from access to some or all of the memory and hardware accessories of the game set (22). Accordingly, the authentication module functions in conjunction with the validation module to control access to restricted memory and hardware of the CPU of the game set.

In a further embodiment, the authentication module may include a further verification process in which the bits of the key would constantly be changing. An example of this further verification is shown in the flow chart (30) of FIG. 2. As in FIG. 1, following access to the verification apparatus, (32), the application is queried for presentation of a key (34). If the application has a key, the key is presented to an authentication module and the application obtains a value from the authentication module (36). A new key is then computed (38) based upon the value obtained from the application in conjunction with the value obtained from the authentication module at step (36). The new key is then presented to a validation module (40). If the key is determined to be a valid key at step (42), then the validation module permits the application access to some or all of the memory and hardware accessories of the game set (44). However, if the key is determined to be an invalid key at step (42), then the validation module prevents the application from access to some or all of the memory and hardware accessories of the game set (46). Similarly if the application does not have a key at step (34), then the authentication module prevents the application from access to some or all of the memory and hardware accessories of the game set (46). Accordingly, the authentication module provides a known value and computes a new key based upon the known value and the key for presentation to the validation module to control access to restricted memory and hardware of the CPU of the game set.

Figure 2:
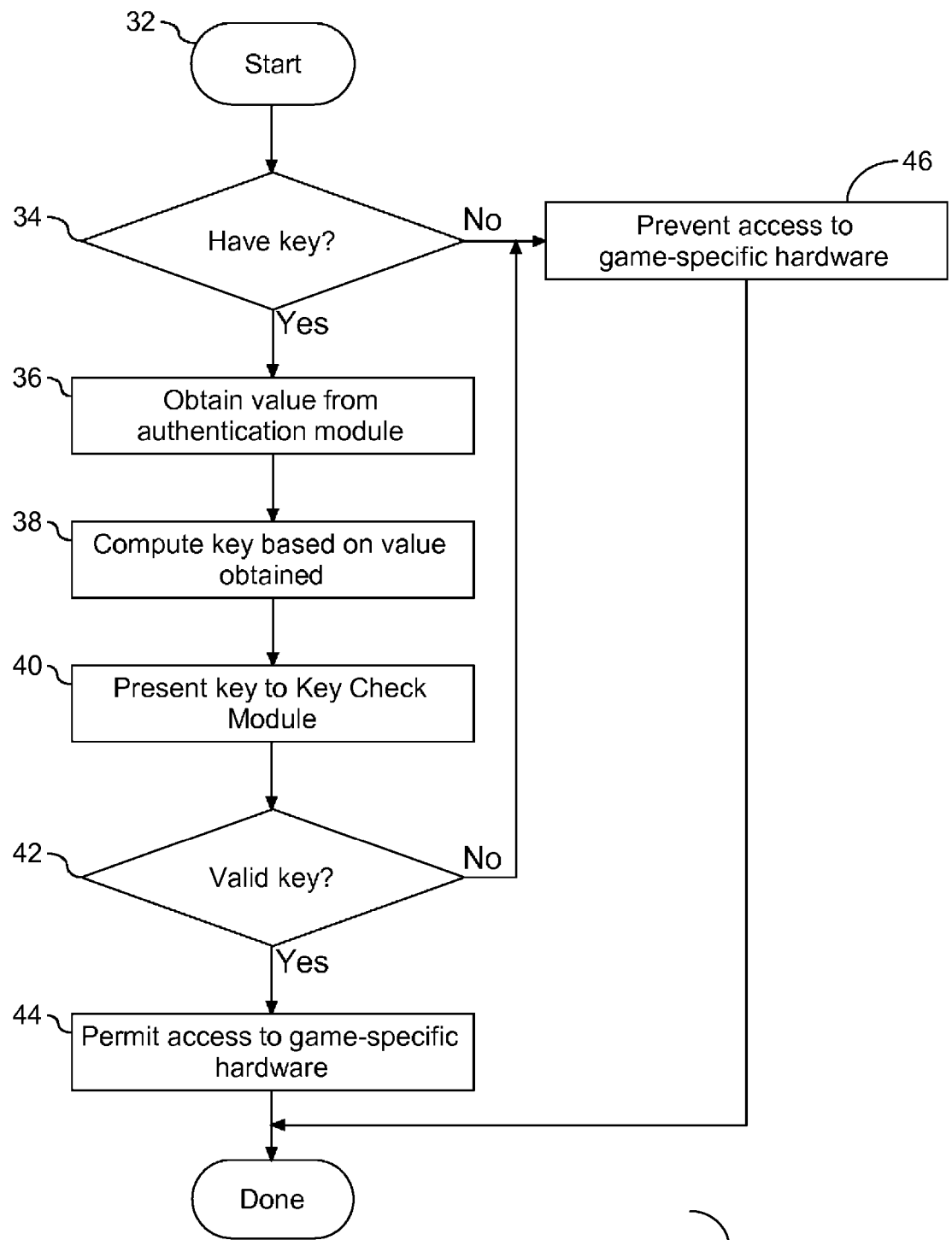
FIG. 2 is a flow chart illustrating the process of instituting a challenged response in conjunction with the presentation of a key to the authentication module.

As shown in FIG. 2, the authentication module presents a value from which a new key may be computed for presentation to the validation module. The purpose of this further step is to provide a challenged response to defeat playback attacks. Once the computed key has been accepted by the validation module, the application may access available hardware and emulate hardware to which access has been denied. One example of a value for computation of the new key is a timestamp. Since time is a value that is constantly changing, the key value presented to the validation module will never be the same. Accordingly, the process outlined in FIG. 2 is an alternative embodiment that provides an extra level of protection from unauthorized access to hardware resources.

Figure 3:
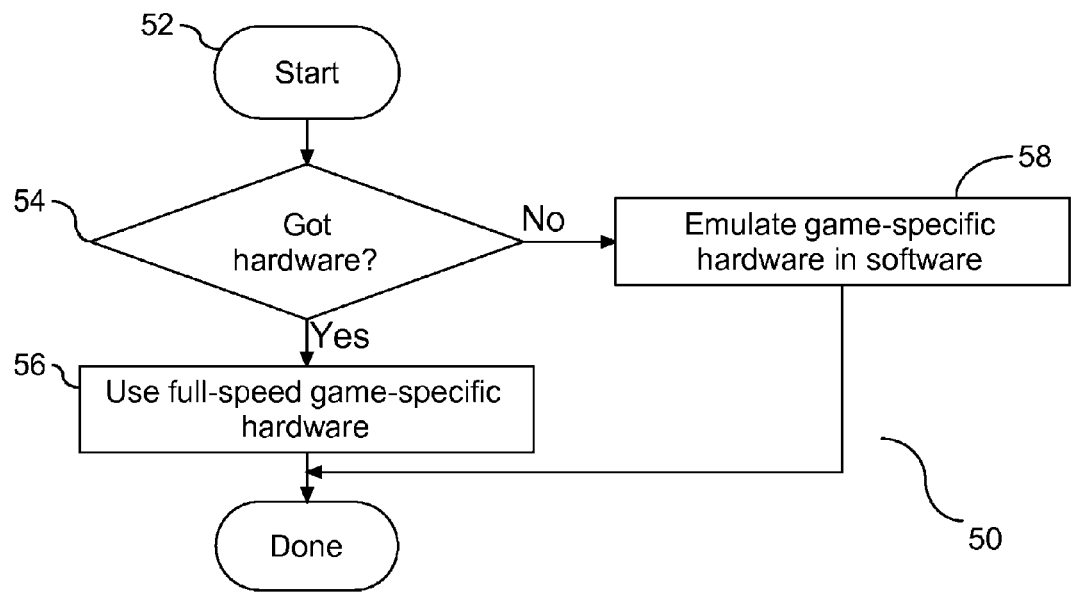
FIG. 3 is a flow chart illustrating the process of the verification application following key authentication.

Following a positive response from the validation module, the application may or may not have access to certain hardware resources of the game set. FIG. 3 is a flow chart (50) illustrating the process following presentation of the key to the validation module in steps (18) and (42) of FIGS. 1 and 2, respectively. Following presentation to the validation module (52), the application will be queried to determine if it has been provided access to the hardware resources of the CPU (54) based on the response received from steps (18) or (42). If the application does have access to the hardware resources, it may use the full speed game specific hardware available (56). However, if the application does not have access to all or some of the hardware resources, it must emulate the game specific hardware to which it has been denied access (58). Accordingly, the process outlined in FIG. 3 shows the steps for the application following the presentation of the key to the validation module.

Figure 4:
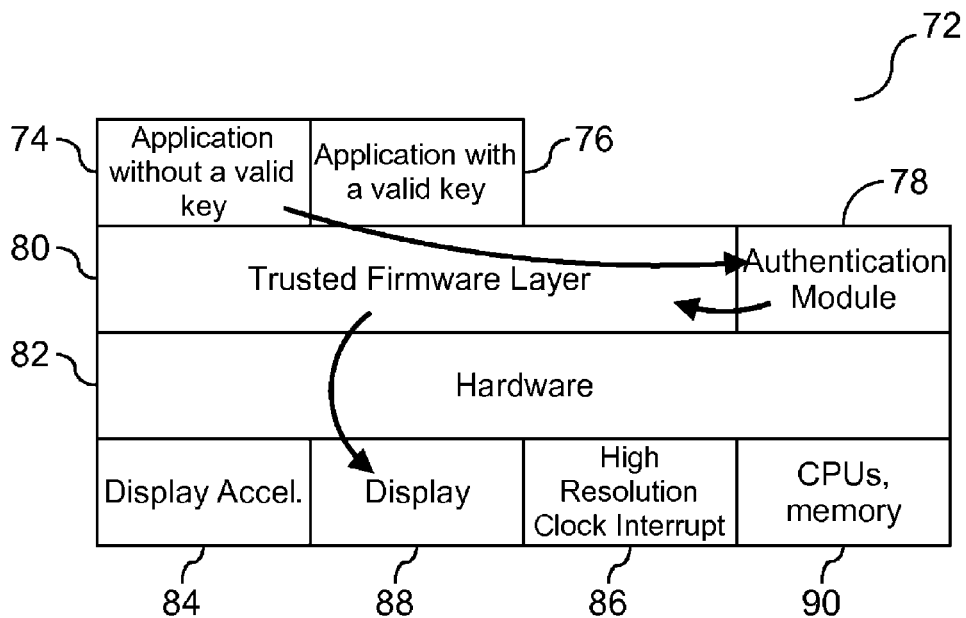
FIG. 4 is a block diagram of the components of the system and the presentation of a non-valid key by a non-game application to the authentication module according to the preferred embodiment of this invention, and is suggested for printing on the first page of the issued patent.

FIG. 4 is a block diagram (72) illustrating the different components of the game set system. In this illustration either an application with a valid key (74) or an application without a valid key (76) may be requesting access to the hardware components of the game set system. The authentication module (78) is within the trusted firmware layer of the system (80). In addition, the system includes the hardware (82) of the game set. The hardware may include a display accelerator (84), a high resolution clock interrupt (86), as well as standard video hardware (88) and CPU memory (90). In this illustration, an application (76) with a non-valid key presents the key to the authentication module (78) within the trusted firmware layer (80). The validation module determines that the key is not valid and limits access of the non-game application to the standard video hardware (88). The unauthorized software may emulate the enhanced functions of the CPU. However, this generally provides poor quality results, such as a slow display, reduced graphics resolution, and/or decreased realism.

Figure 5:
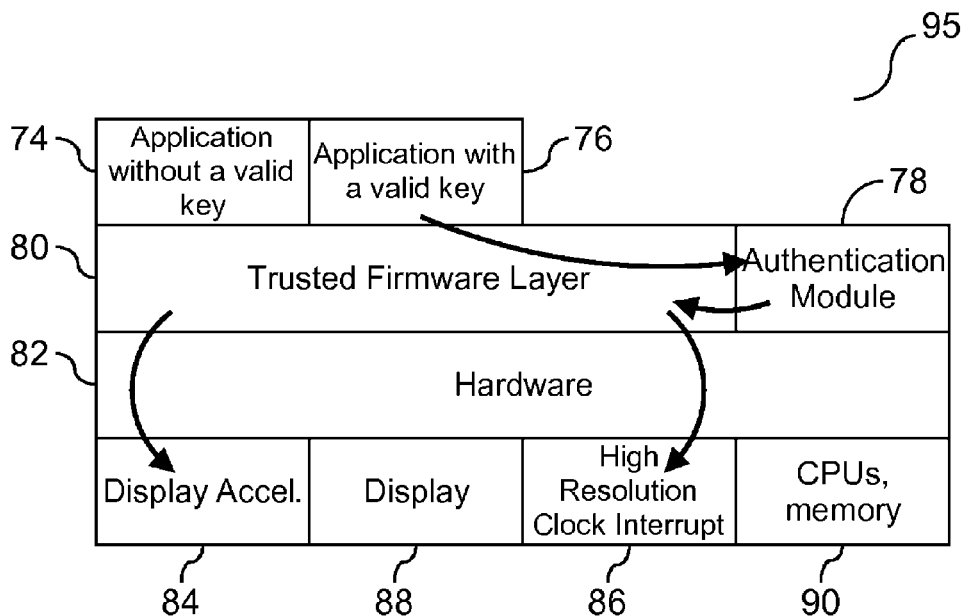
FIG. 5 is a block diagram of the components of the system and the presentation of a valid key by a non-game application to the authentication module.

Similarly, FIG. 5 is a block diagram (95) illustrating the components of the game set system as shown in FIG. 4. However, in this illustration, an application (76) presents a valid key to the authentication module (78) within the trusted firmware layer (80). The validation module determines that the key is valid and enables access of the application to the display accelerator (84) and the high resolution clock interrupt (86). Accordingly, FIGS. 4 and 5 are merely illustrative of the structure of the system and the placement of the authentication module within the trusted firmware layer.

The authentication module may be implemented in software as part of the trusted firmware layer. In this embodiment, the key is presented to the authentication module through a firmware call, such as a software interrupt or a protected procedure call. Through the software, the application gives the key to the trusted firmware layer which presents the key to the validation module. During the interrupt or procedure call, the software can communicate with the validation module. An application program interface (API) executes a call to enable the validation module to either validate or invalidate the key. Upon validation of the key the software will be provided or denied access to the hardware resources of the CPU. In the case of the software implementation of the authentication module, the trusted firmware layer controls restricted access to the hardware resources. Accordingly, this enables the software and firmware to communicate with the validation module within the firmware layer that stores the addresses for the hardware resources.

Alternatively, the authentication module may utilize hardware registers for presentation of the key. A set of registers of the CPU are set aside for assigning key verification instructions. The register is resident in a CPU and an external CPU cannot access the registers of another CPU. A first register holds the key address, a second register communicates with the hardware resource, and a third register may be used to present a value from which the key must be computed. The third register is only necessary in the case of a challenged response where an arbitrary value is set aside for computation of the key as shown in FIG. 2. The execution of an authentication instruction will reference addresses indicated by the first and second registers. The authentication instruction specifies a request for authentication of the key address held by the first register. Upon validation of the key held by the first register, the second register will provide access to the hardware it controls. In the embodiment which encompasses computation of the key, the value for the computation is held in the third register. The computation is conducted as shown in step (38) of FIG. 2. Accordingly, the hardware registers may be implemented in conjunction with the authentication and validation modules to control access of an application to hardware resources.

ADVANTAGES OVER THE PRIOR ART

The present invention restricts access to the authentication module by placing it within the trusted firmware layer of the CPU. The firmware controls the address location of the hardware resources in communication with the CPU. As such, the placement of the authentication module within the trusted firmware layer provides another level of restriction to the hardware resources. The achievement of the authentication module in conjunction with the validation module enables restricted access to the hardware resources that are otherwise not accessible to non-authorized applications. The authentication and validation modules provide limited access to the hardware resources for uses such as research and development and/or other educational purposes. Accordingly, the authentication and validation modules provide a level of security to the game set manufacturers to prevent unauthorized access to the hardware resources of the game set as well as provide security against unauthorized access of game accessories to the hardware resources.

Alternative Embodiments

It will be appreciated that, although specific embodiments of the invention have been described herein for purposes of illustration, various modifications may be made without departing from the spirit and scope of the invention. In particular, the challenged response to the key may take on a variety of forms either embedded in the software or hardware. Additionally, one could take steps to ensure that the program in the cartridge or disc could not be executed on unauthorized hardware or on a simulator. One could also take steps to ensure that the execution of the software on the game set could not be subjected to unauthorized monitoring by a logic analyzer or other equipment. Accordingly, the scope of protection of this invention is limited only by the following claims and their equivalents.

We claim:

1. An article comprising:
   a computer program product stored in a computer readable storage device having instructions comprising:
   computer readable code to present a cryptographic key to an authentication module, said authentication module accessed through a trusted firmware layer;
   computer readable code for a validation module to process validation of said key through a firmware call; and
   computer readable code for an authentication module to restrict access of an unauthorized application to computer hardware resources in response to a determination of presentation of an invalid key, including allowing access of the unauthorized application to a reduced set of said hardware resources.

2. The article of claim 1, wherein key verification is implemented in software as part of the trusted firmware layer.

3. The article of claim 1, wherein key verification is implemented in a hardware register.

4. The article of claim 1, wherein access of an unauthorized application to said hardware is responsive to presentation of said key to said verification module.

5. The article of claim 1, wherein said hardware is selected from the group consisting of: a graphics accelerator, a floating point accelerator, a high resolution frame buffer, and combinations thereof.

6. The article of claim 1, wherein said hardware is a central processing unit of a game set.

7. A game set comprising:
   a central processing unit having an acceleration hardware resource;
   an authentication module accessed via a trusted firmware layer to verify a cryptographic key presented by an application requesting access to said hardware resource; and
   a validation module responsive to verification of said key;
   said authentication module to determine validity of said key, including allowing access of said application with a valid key to said hardware resource, and limiting access of said application with an invalid key to a select set of hardware resources.

8. The game set of claim 7, wherein said key is computed from a value previously obtained from said authentication module.

9. The game set of claim 7, wherein said authentication module is implemented in software as part of the trusted firmware layer.

10. A method for restricting access to computer hardware comprising:
    presenting a cryptographic key to an authentication module;
    accessing said authentication module through a trusted firmware layer;
    validating said key through a firmware call using a validation module; and the authentication module restricting access of an unauthorized application to computer hardware resources in response to a determination of presentation of an invalid key, including allowing execution of the unauthorized application to a reduced set of said hardware resources.

11. The method of claim 10, wherein the step of validating said key includes presenting said key through a firmware call.

12. The method of claim 11, wherein said firmware call is selected from the group consisting of: a software interrupt and a protected procedure call.

13. The method of claim 10, wherein the step of validating said key includes writing a valid key to a hardware register of said computer hardware.

14. The method of claim 10, wherein hardware is selected from the group consisting of: a graphics accelerator, a floating-point accelerator, a high-resolution frame buffer, and combinations thereof.

15. The method of claim 10, wherein said computer hardware is a central processing unit of a game set.

* * * * *